US012724182B1

(12) United States Patent
Denis et al.

(10) Patent No.: US 12,724,182 B1
(45) Date of Patent: Sep. 1, 2026

(54) FABRICATION OF BINARY-PHASE PHOTON SIEVE

(71) Applicant: United States of America as represented by the Administrator of NASA, Washington, DC (US)

(72) Inventors: Kevin L. Denis, Greenbelt, MD (US); Douglas M. Rabin, Greenbelt, MD (US); Adrian N. Daw, Greenbelt, MD (US); Jacob Parker, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 233 days.

(21) Appl. No.: 18/383,194

(22) Filed: Oct. 24, 2023

(51) Int. Cl.
*C23F 1/02* (2006.01)
*G02B 5/18* (2006.01)

(52) U.S. Cl.
CPC .............. *G02B 5/1857* (2013.01); *C23F 1/02* (2013.01); *G02B 5/1838* (2013.01)

(58) Field of Classification Search
None
See application file for complete search history.

(56) References Cited

U.S. PATENT DOCUMENTS 5,814,237 A * 9/1998 Park .................... G02B 5/1857 216/75
11,424,401 B1 * 8/2022 Denis .................... H10N 60/83
2015/0378261 A1 * 12/2015 Englund ................ C09K 13/00 216/94
2016/0136583 A1 * 5/2016 Asadi ................... H01L 21/027 210/490
2016/0276979 A1 * 9/2016 Shaver ................. H01Q 15/148

* cited by examiner

*Primary Examiner* — Shamim Ahmed
(74) *Attorney, Agent, or Firm* — Heather Goo; Matthew F. Johnston; Trenton J. Roche

(57) ABSTRACT

Fabrication of a binary-phase photon sieve begins with the deposition of a layer of a material on a substrate. The layer does not exceed 0.5 microns in thickness and has an optical energy transmittance of at least 30% in the extreme ultraviolet (EUV) wavelength spectrum. The first face of the layer is exposed and a second face of the layer is adhered to the substrate. A set of holes is generated through the layer of the material. An etch-resistant cover is attached to the layer of the material with the set of holes. A portion of the substrate is then etched to expose a portion of the second face of the layer of the material with the set of holes, while a remainder of the substrate remains intact. The etch-resistant cover is then removed.

16 Claims, 2 Drawing Sheets

FABRICATION OF BINARY-PHASE PHOTON SIEVE

ORIGIN OF THE INVENTION

Figure 1:
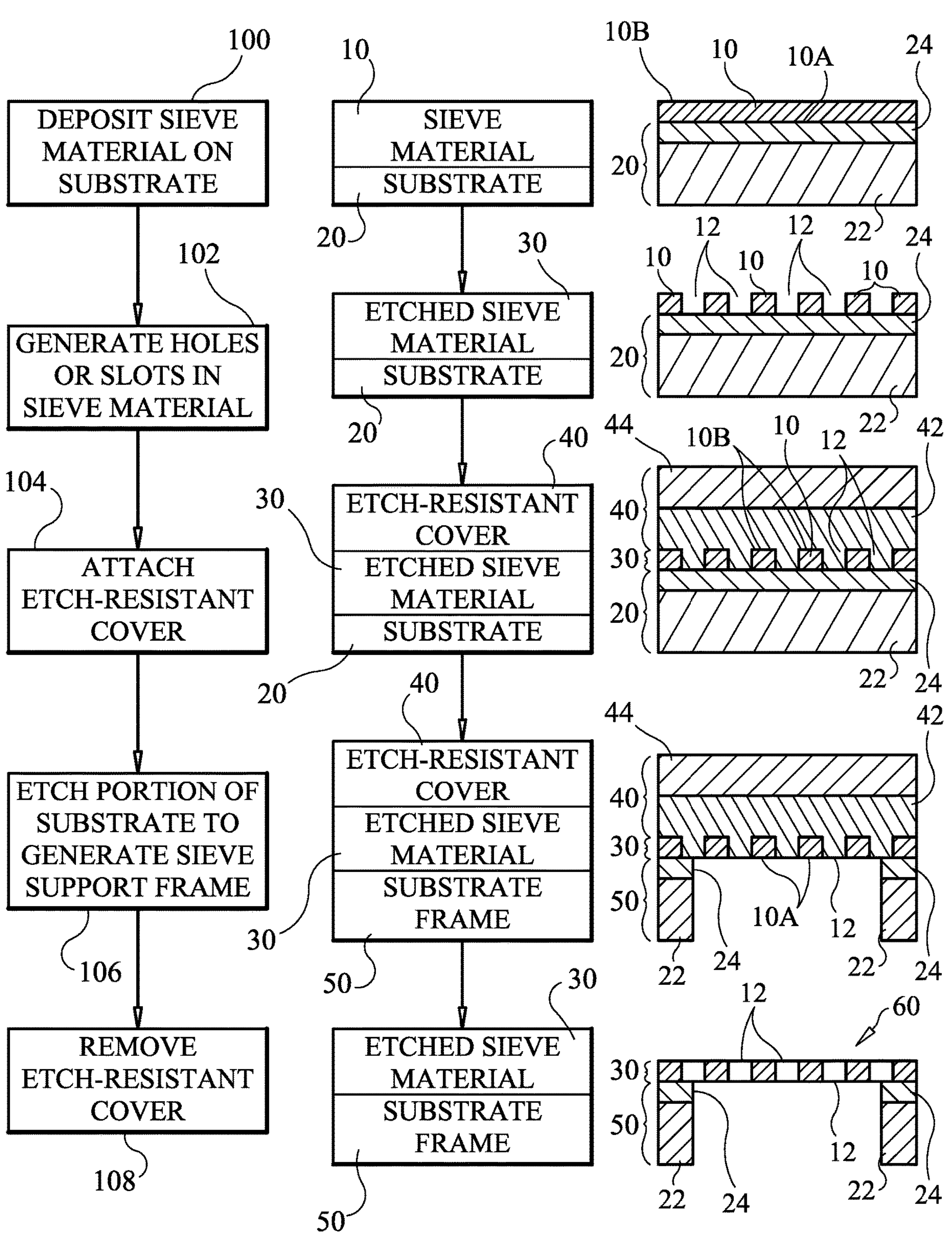

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to photon sieves. More specifically, the invention is method for fabricating binary-phase photon sieves suitable for operation in selective frequency spectrums such as imaging operations in the extreme ultraviolet (EUV) spectrum.

2. Description of the Related Art

Photon sieves are similar to traditional Fresnel zone plates except that the alternating transparent and opaque concentric zones of a Fresnel zone plate are replaced by concentric rings of holes (e.g., circular holes, arc-shaped holes or slots also known simply as "arcs") in a photon sieve. Photon sieve architecture lends itself to applications requiring large-area perforated membranes where opaque membranes have holes etched through a membrane's solid material to form desired diffractive imaging properties. When the membrane is optically thick and opaque, these types of photon sieves are referred to as binary-amplitude photon sieves since light transmits only in the areas where the holes or arcs are etched. The optical efficiency of a binary-amplitude photon sieve is proportional to the area of the holes or arcs. For a round-hole-based sieve, efficiencies of up to 4% are achievable, while efficiencies up to 9% may be achieved when the round holes are replaced with arcs having a length-to-width aspect ratio on the order of 15:1.

For extreme ultraviolet (EUV) applications in the 10-120 nanometer wavelength range where material losses are high, submicron thickness membranes are required for a photon sieve. At such membrane thicknesses, a photon sieve's solid-material zones will transmit optical energy. Since the transmitting holes/arcs of a photon sieve are designed to diffract light in phase, the photon sieve's solid-material zones are necessarily 180° out-of-phase (i.e., at least in the center of each solid-material zone). That phase shift, due to the geometry, allows the light to combine back in phase at the focus of the photon sieve (e.g., serving as an optical lens) to increase the effective transmission efficiency of the lens (i.e., reducing optical loss) if the thickness of the transmitting membrane material is designed such that an additional 180° phase shift is achieved. In general, a binary-phase sieve increases the optical efficiency for a lens as compared to a binary-amplitude sieve. Unfortunately, fabrication of binary-phase photon sieves for EUV applications has proven elusive owing to the problems associated with submicron thickness membranes.

SUMMARY OF THE INVENTION

Accordingly, it is an object of the present invention to provide a method for fabricating binary-phase photon sieves.

Another object of the present invention to provide a method for fabricating binary-phase photon sieves suitable for operation in selective frequency spectrums.

Still another object of the present invention is to provide a method for fabricating binary-phase photon sieves for operation in extreme ultraviolet (EUV) imaging applications.

Other objects and advantages of the present invention will become more obvious hereinafter in the specification and drawings.

In accordance with the present disclosure, fabrication of a binary-phase photon sieve begins with the deposition of a layer of a material on a substrate. The layer has a thickness not to exceed 0.5 microns and has an optical energy transmittance of at least 30% in the extreme ultraviolet (EUV) wavelength spectrum ranging from 10-120 nanometers. The first face of the layer is exposed and a second face of the layer is adhered to the substrate. A set of holes is generated through the layer of the material. An etch-resistant cover is attached to the layer of the material with the set of holes. A portion of the substrate is then etched to expose a portion of the second face of the layer of the material with the set of holes, while a remainder of the substrate remains intact. The etch-resistant cover is then removed leaving the layer of the material with the set of holes being supported by the remainder of the substrate.

BRIEF DESCRIPTION OF THE DRAWING(S)

Figure 2:
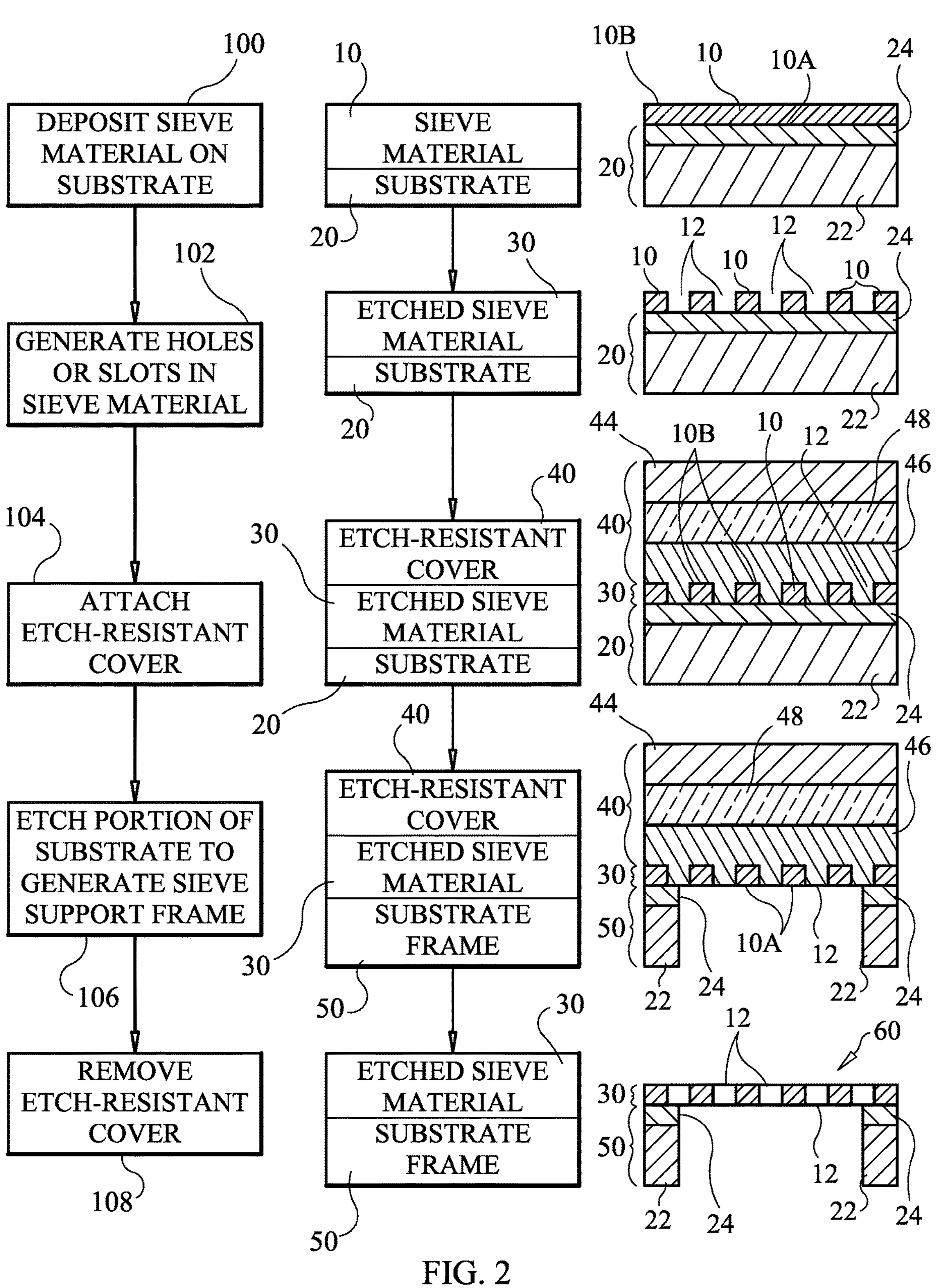

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a flow diagram with corresponding schematic and cross-sectional illustrations of an embodiment of a method of fabricating a binary-phase photon sieve in accordance with various aspects as described herein; and FIG. 2 is a flow diagram with corresponding schematic and cross-sectional illustrations of another embodiment of a method of fabricating a binary-phase photon sieve in accordance with various aspects as described herein.

DESCRIPTION OF THE PREFERRED EMBODIMENT(S)

The present disclosure describes methods and systems for fabricating a binary-phase photon sieve. By way of an illustrative example, the present disclosure will disclose details related to the fabrication of a binary-phase photon sieve for use in extreme ultraviolet (EUV) applications that must process optical energy in the 10-120 nanometer wavelength range. However, it is to be understood that the process described herein may also be used in the fabrication of metamaterial/frequency selective surface structures from the x-ray to the terahertz (THz) frequency range and may be used in instruments requiring these technologies.

Referring now to the drawings and more particularly to FIG. 1, a flow diagram is illustrated of an embodiment of a method of fabricating a binary-phase photon sieve in accordance with the present disclosure. Adjacent to each of the flow diagram's process blocks are corresponding schematic and cross-sectional illustrations of a structure resulting from completion of each process block. In terms of the cross-sectional illustrations, it is to be understood that the figures are drawn to clearly illustrate the structure's features but are not drawn to scale.

At block 100, a layer of a material 10 that is to ultimately form the optical portion of a binary-phase photon sieve is deposited onto a substrate 20. Accordingly, the layer of material 10 will be referred to hereinafter as sieve material 10. In some embodiments where the ultimate binary-phase photon sieve will be operating in the extreme ultraviolet (EUV) wavelength spectrum ranging from 10-120 nanometers, sieve material 10 may have a transmittance of at least 30% of the EUV optical energy incident thereon. For such EUV applications, sieve material 10 may have a thickness not to exceed 0.5 microns. Thicker materials could be used for operation in other wavelength ranges. Exemplary materials for sieve material 10 for EUV applications may include silicon, silicon nitride, niobium, zirconium, and mixtures thereof.

Substrate 20 may be any suitable substrate material that is compatible with the present disclosure's fabrication process and that is capable of being configured to define a support frame of the ultimate binary-phase photon sieve as will be described further below. In some embodiments, substrate 20 may be a wafer 22 of silicon coated on a surface thereof with silicon dioxide 24. Following deposition block 100, one face 10A of sieve material 10 is adhered to the silicon dioxide 24 and one face 10B of sieve material 10 is exposed.

At block 102, a set of holes 12 is generated (e.g., etched) all the way through sieve material 10 resulting in the generation of an etched sieve material 30. The number of holes 12 as well as their size, shape, position, etc., may be configured in accordance with the requirements of the ultimate binary-phase photon sieve as is understood in the art of photon sieves. For example, holes 12 may be circular, slotted, arc-shaped slots or "arcs", etc. The particular etch process used to generate holes 12 is not a limitation of the present disclosure. Suitable etching processes include, but are not limited to, fluorine or chlorine based reactive ion etching, argon ion milling, wet chemical etches, or photolithographic lift-off processes.

At block 104, a protective etch-resistant cap or cover 40 is attached to etched sieve material 30. In some embodiments, cover 40 is a layered structure that may include a bond material 42 filling holes 12 and adhering to etched sieve material 30, and a handle 44 (e.g., made from a glass such as PYREX, silicon, sapphire, etc.) that is adhered to bond material 42. Handle 44 provides mechanical support during subsequent etching processes as will be explained further below. In some embodiments, bond material 42 may be a wax or a low glass-transition temperature polymer such as a photoresist. In some embodiments, bond material 42 is applied as a liquid such that it easily fills holes 12 of etched sieve material 30 to thereby prevent development of air or vacuum pockets that can get hot and expand during processing that, in turn, may cause damage to etched sieve material 30.

At block 106, a portion of substrate 20 is removed (e.g., via etching process(es)) such that a remaining portion of substrate 20 remains intact with the remaining portion of substrate 20 defining a substrate frame 50. The size and shape of substrate frame 50 are not limitations of the present disclosure as they may be tailored for the requirements of a particular application. In some embodiments where substrate 20 includes silicon wafer 22 as described above, the removal process of portions of silicon wafer 22 may be accomplished using deep reactive ion etching (DRIE) with the corresponding portion of silicon dioxide 24 being subsequently etched using, for example, aqueous or vapor-phase hydrofluoric acid chemistry.

At block 108, the etch-resistant cover 40 is removed leaving an ultimate binary-phase photon sieve 60 having the etched sieve material 30 supported on the substrate frame 50. Removal of cover 40 may be accomplished by dissolving bond material 42 thereby simultaneously releasing handle 44. In some embodiments where bond material 42 may be a wax, removal block 108 may be accomplished by dissolution in acetone. In some embodiments where bond material 42 may be a polymer, removal block 108 may be accomplished by dissolution in acetone or using alkene-based chemistry such as dodecene.

For large-aperture (e.g., aperture diameters on the order of 10 millimeters or greater) binary-phase photon sieves fabricated in accordance with the present disclosure, it may be necessary to provide stiff mechanical support for the etched sieve material 30 resulting from the above-described etching block 102. In such cases, the above-described etch-resistant cover or cap may additionally include a stiffening layer as illustrated in FIG. 2 where common reference numerals are used to reference the previously-described process blocks and corresponding schematic and cross-sectional views. To stiffen etched sieve material 30, block 104 in the FIG. 2 embodiment attaches an etch-resistant cover 40 that may include a layer of metal 46 (e.g., indium, gold, or aluminum) adhered to etched sieve material 30 as well as exposed portions of silicon dioxide 24 as metal 46 fills holes 12. In some embodiments, metal 46 may be deposited by vapor deposition or through electro-plating. The above-described handle 44 may be coupled to metal 46 using a bond material 48 which may be a permanent bond since removal block 108 may be accomplished via dissolution of metal 46 such that bond 48 along with handle 44 are then simultaneously released to yield the ultimate binary-phase photon sieve 60.

In embodiments using permanent bonding materials for bond material 48, a permanent bonding material such as benzocyclobutene or SU-8 may be used as they have high glass transition temperatures resulting in minimal viscous flow during high temperature processes that might damage the thin etched sieve material 30. Removal of metal 46 may be accomplished through required chemistry such as iodine-based etching for gold, hydrochloric acid etching for indium and phosphoric acid-based etching for aluminum. The removal process for the metal stiffener should be compatible with and not etch the sieve material 30. Such methods and chemistries would be well-known to those skilled in the art.

The advantages of the present methods and systems are numerous. High-quality, ultra-thin, binary-phase photon sieves may be fabricated simply and efficiently for a variety of applications to include operation in the EUV wavelength spectrum. Using the fabrication process described herein, exemplary binary-phase photon sieves having optical efficiencies approaching 20% (e.g., for a 220 nanometer thick niobium membrane having arcs with a 15:1 length-to-width aspect ratio). As mentioned above, the fabrication process of the present disclosure may be extended to the fabrication of metamaterial/frequency selective surface structures from the x-ray to the terahertz (THz) frequency range. Such structures often depend on supporting membranes which can increase absorption reducing performance of the device. The fabrication process described herein allows for the removal of the support membranes.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of fabricating a large diameter photon sieve, the method comprising:

depositing a layer of a material on a substrate, the layer having a thickness not to exceed 0.5 microns and an optical energy transmittance of at least 30% in the extreme ultraviolet (EUV) wavelength spectrum ranging from 10-120 nanometers, wherein a first face of the layer is exposed and a second face of the layer is adhered to the substrate;

generating a set of holes through the layer of the material;

attaching an etch-resistant cover to the layer of the material with the set of holes;

etching a portion of the substrate to expose a portion of the second face of the layer of the material with the set of holes, wherein a remainder of the substrate remains intact; and removing the etch-resistant cover wherein the layer of the material with the set of holes is supported by the remainder of the substrate, whereby forming an ultra-thin large diameter perforated membrane said membrane having a diameter of at least 10 millimeters.

2. The method of claim 1, wherein the material is selected from the group consisting of silicon, niobium, zirconium, and mixtures thereof.

3. The method of claim 1, wherein the substrate comprises a wafer of silicon coated with silicon dioxide, and wherein the second face of the layer is adhered to the silicon dioxide.

4. The method of claim 1, wherein the etch-resistant cover comprises:

a bond material coupled to the first face of the layer of material with the set of holes, whereby the bond material is a permanent polymer bond that does not reflow at high temperature; and a handle coupled to the bond material, wherein the handle is selected from the group consisting of a glass, silicon, and sapphire.

5. The method of claim 1, wherein the etch-resistant cover comprises:

a layer of metal coupled to the first face of the layer of material with the set of holes, the layer of metal providing stiffening to the layer with holes during manufacturing, the layer of metal thermally conducting heat away from a center of the layer with holes, and the layer of metal capable of being dissolved away to allow for the first layer of material with holes to be removed from the etch resistant cover;

a bond material coupled to the layer of metal; and a handle coupled to the bond material, wherein the handle is selected from the group consisting of a glass, silicon, and sapphire.

6. The method of claim 5, wherein the metal is selected from the group consisting of indium, gold, and aluminum.

7. A method of fabricating a large diameter photon sieve, the method comprising:

depositing a layer of a material on a substrate, the layer having a thickness not to exceed 0.5 microns and an optical energy transmittance of at least 30% in the extreme ultraviolet (EUV) wavelength spectrum ranging from 10-120 nanometers, wherein a first face of the layer is exposed and a second face of the layer is adhered to the substrate;

etching a set of holes through the layer of the material;

adhering a layered etch-resistant cap to the layer of the material with the set of holes, wherein a portion of the layered etch-resistant cap fills the holes;

etching a portion of the substrate to expose a portion of the second face of the layer of the material with the set of holes, wherein a remainder of the substrate remains intact; and removing the layered etch-resistant cap wherein the layer of the material with the set of holes is supported by the remainder of the substrate and forming an ultra-thin large diameter perforated membrane, said membrane having a diameter of at least 10 millimeters, which is operable as a photon sieve.

8. The method of claim 7, wherein the material is selected from the group consisting of silicon, niobium, zirconium, and mixtures thereof.

9. The method of claim 7, wherein the substrate comprises a wafer of silicon coated with silicon dioxide, and wherein the second face of the layer is adhered to the silicon dioxide.

10. The method of claim 7, wherein the layered etch-resistant cap comprises:

a bond material covering the first face of the layer of the material and filling the holes, whereby the bond material is a permanent polymer bond that does not reflow at high temperature; and a handle coupled to the bond material, wherein the handle is selected from the group consisting of a glass, silicon, and sapphire.

11. The method of claim 7, wherein the layered etch-resistant cap comprises:

a layer of metal covering to the first face of the layer of the material and filling the holes, the layer of metal providing stiffening to the layer with holes during manufacturing, the layer of metal thermally conducting heat away from a center of the layer with holes, and the layer of metal capable of being dissolved away to allow for the first layer of material with holes to be removed from the etch resistant cover;

a bond material coupled to the layer of metal; and a handle coupled to the bond material, wherein the handle is selected from the group consisting of a glass, silicon, and sapphire.

12. The method of claim 11, wherein the metal is selected from the group consisting of indium, gold, and aluminum.

13. A method of fabricating a large diameter photon sieve, the method comprising:

depositing a layer of a material on a substrate comprising a wafer of silicon coated with silicon dioxide, the layer having a thickness not to exceed 0.5 microns and the material being selected from the group consisting of silicon, niobium, zirconium, and mixtures thereof, wherein a first face of the layer is exposed and a second face of the layer is adhered to the silicon dioxide;

etching a set of holes through the layer of the material;

attaching an etch-resistant cover to the layer of the material with the set of holes;

etching a portion of the substrate to expose a portion of the second face of the layer of the material with the set of holes, wherein a remainder of the substrate remains intact; and removing the etch-resistant cover wherein the layer of the material with the set of holes is supported by the remainder of the substrate, whereby forming an ultra-thin large diameter perforated membrane said membrane having a diameter of at least 10 millimeters.

14. The method of claim 13, wherein the etch-resistant cover comprises:

a bond material coupled to the first face of the layer of material with the set of holes, whereby the bond material is a permanent polymer bond that does not reflow at high temperature; and a handle coupled to the bond material, wherein the handle is selected from the group consisting of a glass, silicon, and sapphire.

15. The method of claim 13, wherein the etch-resistant cover comprises:

a layer of metal coupled to the first face of the layer of material with the set of holes, the layer of metal providing stiffening to the layer with holes during manufacturing, the layer of metal thermally conducting heat away from a center of the layer with holes, and the layer of metal capable of being dissolved away to allow for the first layer of material with holes to be removed from the etch resistant cover;

a bond material coupled to the layer of metal; and a handle coupled to the bond material, wherein the handle is selected from the group consisting of a glass, silicon, and sapphire.

16. The method of claim 15, wherein the metal is selected from the group consisting of indium, gold, and aluminum.

* * * * *